(12) United States Patent
Blackburn, Jr.

(10) Patent No.: US 10,188,044 B1
(45) Date of Patent: Jan. 29, 2019

(54) TREE-TRIMMING DEVICE (71) Applicant: Alde Blackburn, Jr., Ormand Beach, FL (US)

(72) Inventor: Alde Blackburn, Jr., Ormand Beach, FL (US)

( * ) Notice: Subject to any disclaimer, the term of this patent is extended or adjusted under 35 U.S.C. 154(b) by 143 days.

(21) Appl. No.: 15/431,905

(22) Filed: Feb. 14, 2017

(51) Int. Cl.
*B23D 49/16* (2006.01)
*A01G 3/08* (2006.01)
*B23D 51/10* (2006.01)
*B25G 1/04* (2006.01)

(52) U.S. Cl.
CPC .............. *A01G 3/085* (2013.01); *B23D 49/16* (2013.01); *B23D 51/10* (2013.01); *B25G 1/04* (2013.01)

(58) Field of Classification Search
CPC .......... A01G 3/085; A01G 3/08; A01G 3/088; B23D 49/16; B23D 51/10; A61B 17/148
USPC ............. 30/392–394, 243–249; 83/824–826; D8/64
See application file for complete search history.

(56) References Cited

U.S. PATENT DOCUMENTS

| 2,703,928 | A | 3/1955 | Southwick |
| 4,916,818 | A | 4/1990 | Panek |
| 4,924,573 | A | 5/1990 | Huddleston |
| D361,481 | S | 8/1995 | Rees |
| 5,884,403 | A | 3/1999 | Rogers |
| 6,213,672 | B1 * | 4/2001 | Varga ...................... A47L 13/20 15/144.4 |
| 6,240,642 | B1 * | 6/2001 | Templeton ............... A01G 3/08 30/125 |
| 6,848,186 | B1 * | 2/2005 | Chen ..................... B23D 51/10 279/76 |
| 7,484,300 | B2 | 2/2009 | King |
| 8,191,268 | B2 | 6/2012 | Wiletts |
| D677,542 | S * | 3/2013 | Baxter ............................ D8/64 |
| 2004/0049925 | A1 | 3/2004 | Verges |

FOREIGN PATENT DOCUMENTS

EP 1634679 A2 10/2010

* cited by examiner

*Primary Examiner* — Ghassem Alie
*Assistant Examiner* — Nhat Chieu Do
(74) *Attorney, Agent, or Firm* — Kyle A. Fletcher, Esq.

(57) ABSTRACT

The tree-trimming device is adapted for use with a reciprocating saw. The tree-trimming device is adapted for use with a tree or tall shrubbery. The tree-trimming device is a bladed device that attaches to the reciprocating saw. Specifically, the tree-trimming device extends the reach of the reciprocating saw such that the tree-trimming device can be used to remove branches from a tree without the assistance climbing structures and devices. The tree-trimming device comprises a reciprocating shaft, an extension guard and an extensible structure.

15 Claims, 5 Drawing Sheets

TREE-TRIMMING DEVICE

CROSS REFERENCES TO RELATED APPLICATIONS

No Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of horticulture and agriculture, more specifically, a motor driven cutting implement adapted for removing limbs from trees or other horticultural purposes.

SUMMARY OF INVENTION

The tree-trimming device is adapted for use with a reciprocating saw. The tree-trimming device is adapted for use with a tree or tall shrubbery. The tree-trimming device is a bladed device that attaches to the reciprocating saw. Specifically, the tree-trimming device extends the reach of the reciprocating saw such that the tree-trimming device can be used to remove branches from a tree without the assistance climbing structures and devices.

These together with additional objects, features and advantages of the tree-trimming device will be readily apparent to those of ordinary skill in the art upon reading the following detailed description of the presently preferred, but nonetheless illustrative, embodiments when taken in conjunction with the accompanying drawings.

In this respect, before explaining the current embodiments of the tree-trimming device in detail, it is to be understood that the tree-trimming device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tree-trimming device.

It is therefore important that the claims be regarded as including such equivalent construction insofar as they do not depart from the spirit and scope of the tree-trimming device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The tree-trimming device 100 (hereinafter invention) comprises a reciprocating shaft 101, an extension guard 102 and an extensible structure 103. The invention 100 is configured for use with a reciprocating saw 151. The invention 100 is adapted for use with a tree or tall shrubbery. The invention 100 is a bladed device that is configured to attach to the reciprocating saw 151. Specifically, the invention 100 is configured to extend the reach of the reciprocating saw 151 such that the invention 100 can be used to remove branches from a tree without the assistance climbing structures and devices. The reciprocating shaft 151 is configured to connect the extensible structure 103 to the reciprocating saw 151. The extension guard 102 attaches to the reciprocating shaft 151. The extensible structure 103 is inserted through the extension guard 102 before attaching the extensible structure 103 to the reciprocating shaft 101. The extension guard 102 guides the motion of the extensible structure 103 and damps oscillation that may occur within the extensible structure 103.

The reciprocating shaft 101 is further defined with an initial outer dimension 195. The reciprocating shaft 101 is the structure, which attaches the extensible structure to the reciprocating saw 151. The reciprocating shaft 101 is attached to the reciprocating structure of the reciprocating saw 151, which is often referred to as the shoe 152. It is anticipated that in some circumstances the reciprocating structure will be sufficient to attach the extensible structure 103 to the reciprocating saw 151 while in other circumstances the reciprocating shaft 101 will be provisioned by the invention 100. Methods to attach shafts to cranks or other shafts are well known and documented in the mechanical arts.

The extension guard 102 comprises a guard 111, a support 112, and a foot 113. The guard 111 is formed in the shape of the frustum of a pyramid wherein the base of the pyramid is attached to the reciprocating saw 151. The described pyramid need not be a right pyramid and can be a rectangular pyramid. The support 112 is a square structure that forms the frustum surface that is proximal to the apex of the pyramid. The extensible structure 103 is inserted through the support 112 of the extension guard 102. The foot 113 is a structure that attaches to the support 112 such that the foot 113 projects away from the support 112 in a direction away from the reciprocating saw 151. The purpose of the foot 113 is to provide an additional guidance point for the extensible structure 103.

Figure 1:
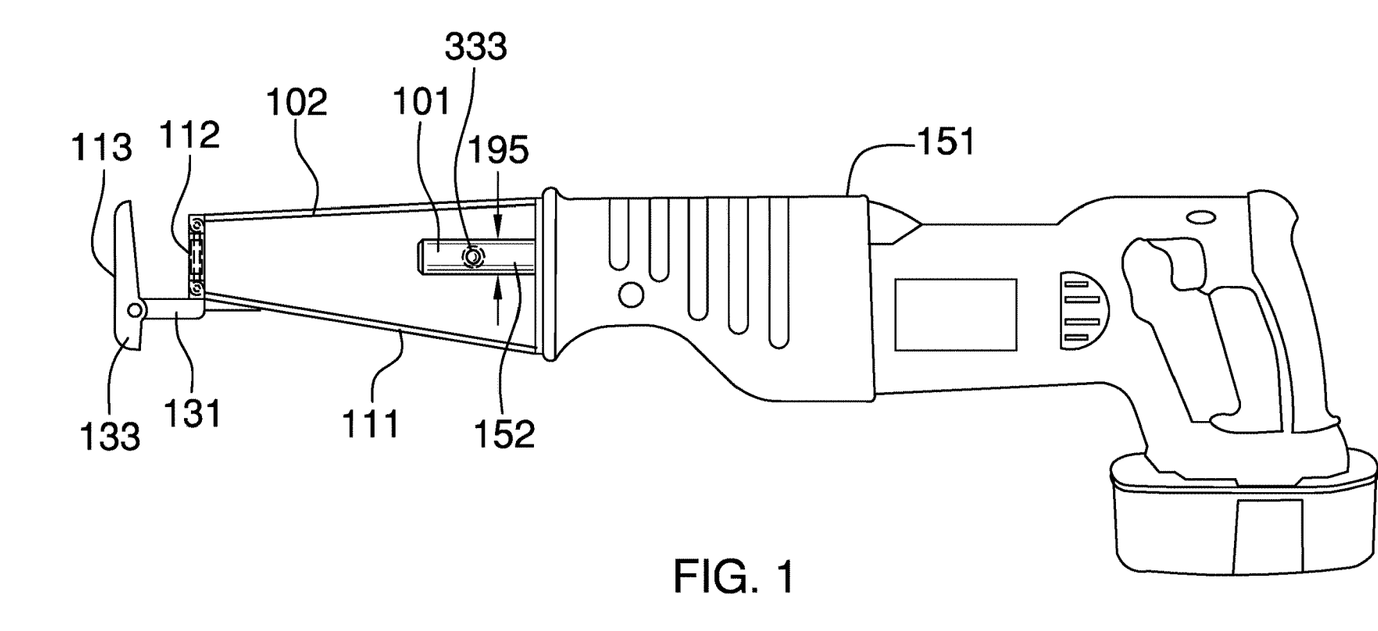
FIG. 1 is a front detail view of an embodiment of the disclosure.
Figure 2:
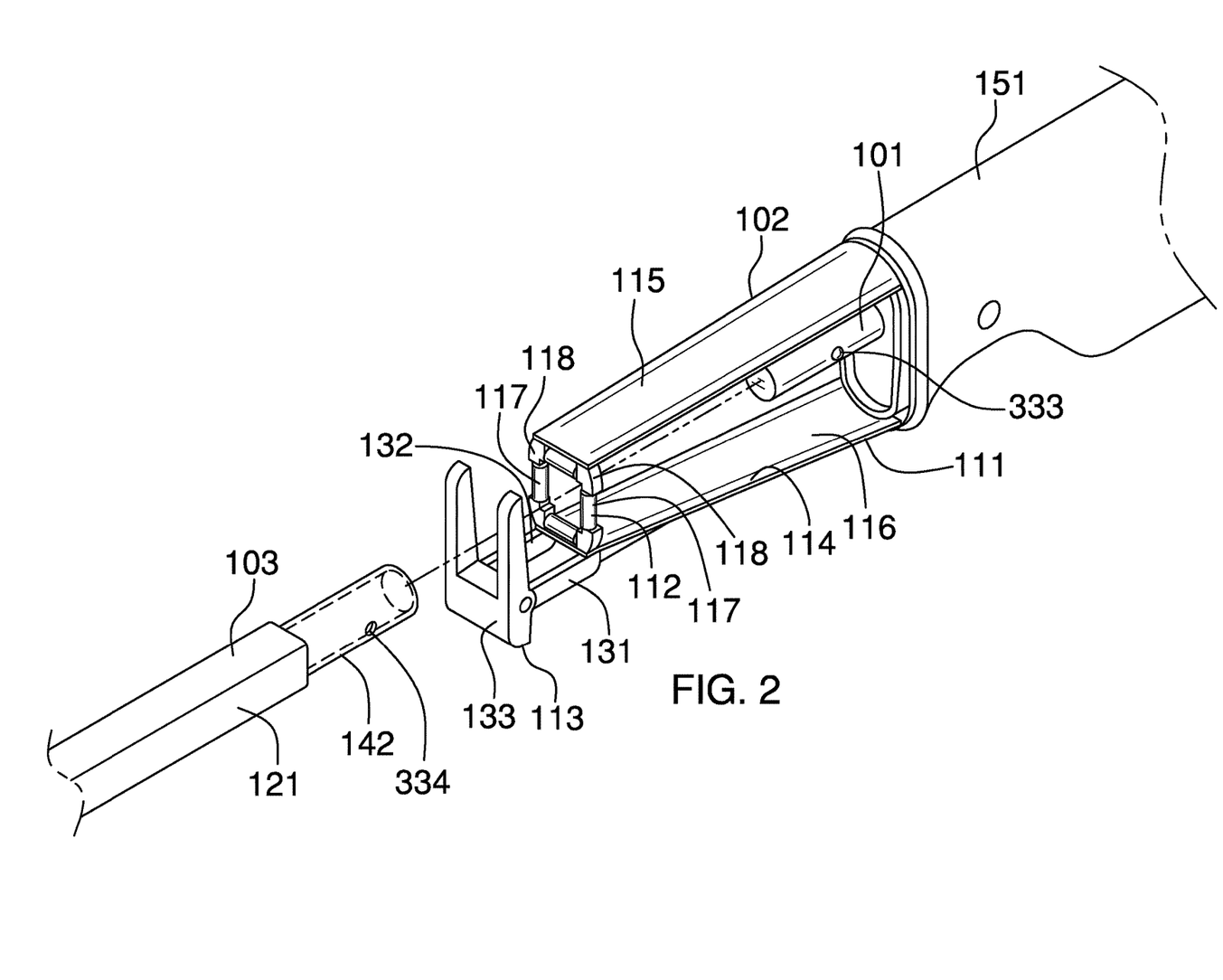
FIG. 2 is a perspective view of an embodiment of the disclosure.
Figure 5:
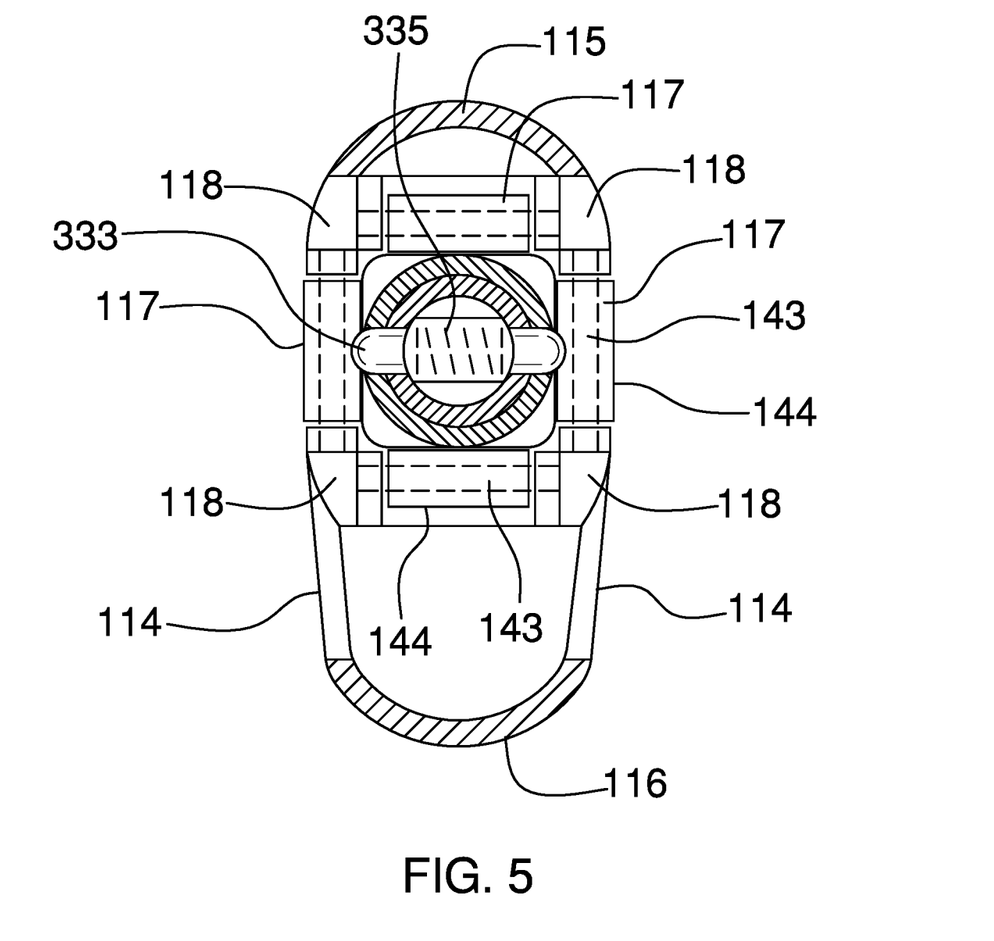
FIG. 5 is a cross-sectional view of an embodiment of the disclosure across 5-5 as shown in FIG. 3.
Figure 6:
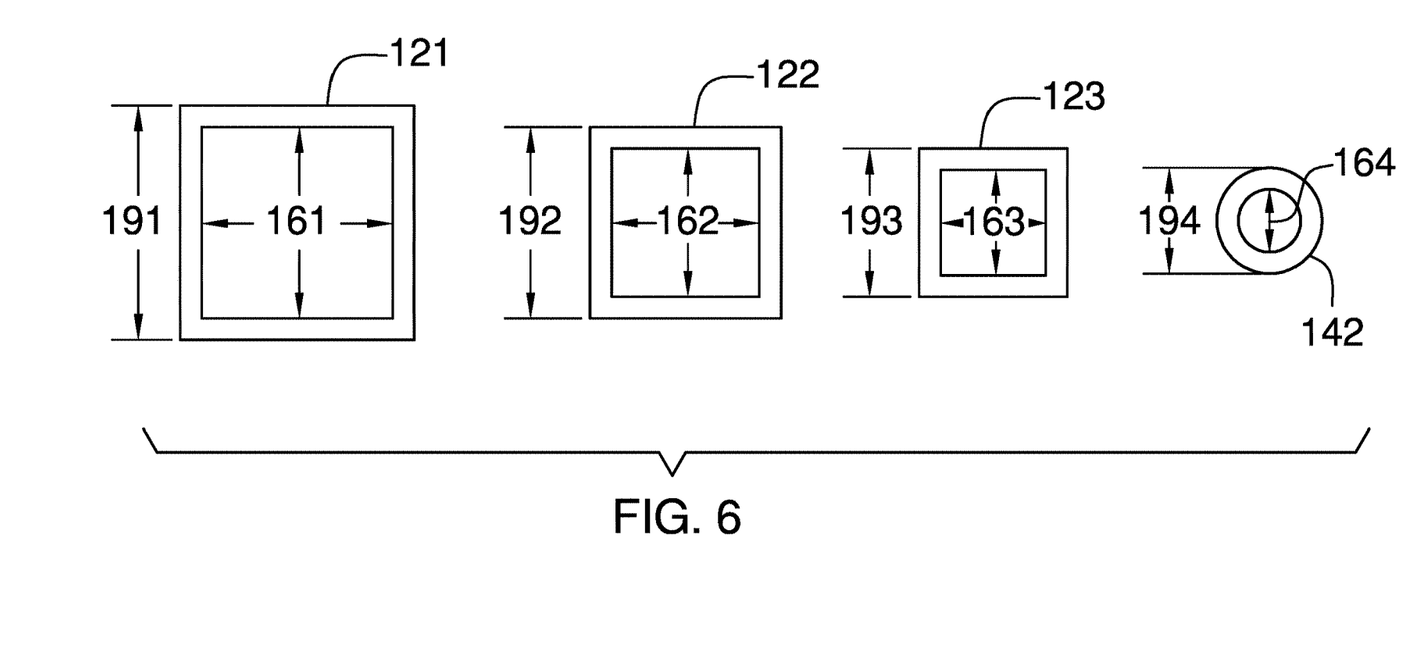
FIG. 6 is a detail view of an embodiment of the disclosure.

As shown most clearly in FIGS. 2 and 5, the guard 111 comprises a frame 114, a top shell 114, and a bottom shell 115. The frame 114 is the structural framework that forms the pyramidal shape of the guard 111 and is formed from a plurality of metal shafts. Methods to form pyramidal structures are well known within the mechanical arts. The bottom shell 116 is a solid surface that forms a face of the pyramid and provides a handhold for handling the invention 100. The top shell 115 is solid surface that forms a face of the pyramid and provides a handhold for handling the invention 100. The top shell 114 is positioned on the face of the pyramid that is distal from the bottom shell 116.

The support 112 comprises a plurality of rollers 117, and a plurality of corners 118. The support 112 is a square shaped structure through which the extensible structure 103 is inserted. Each of the plurality of corners 118 is a square piece of metal. Each of the plurality of corners 118 is used to form a corner of the square shaped structure. As shown most clearly in FIGS. 2 and 5, any first corner selected from the plurality of corners 118 is attached to a second corner selected from the plurality of corners 118 by a roller selected from the plurality of rollers 117. Each of the plurality of rollers 117 is a commercially available friction roller that comprises an inner shaft 143 and an outer shaft 144 wherein the inner shaft 143 and the outer shaft 144 are connected with one or more ball bearings. The plurality of corners are interconnected using the inner shafts 143 of each of the plurality of rollers 117. This arrangement allows the outer shaft 144 to be in contact with the extensible structure 103 and to rotate in response to the reciprocating motion of the extensible structure 103.

The foot 113 comprises a first offset 131, a second offset 132, and a U brace 133. The first offset 131 is a shaft that attached to a corner selected from the plurality of corners 118. The second offset 131 is a shaft is a shaft that attached to a corner selected from the plurality of corners 118. The U brace 133 is a U shaped structure. The extensible shaft 103 is placed within the U brace 133 in a manner that further guides the reciprocating motion of the extensible shaft 103. The first offset 131 and the second offset 132 attach the U brace 133 to the support 112.

Figure 3:
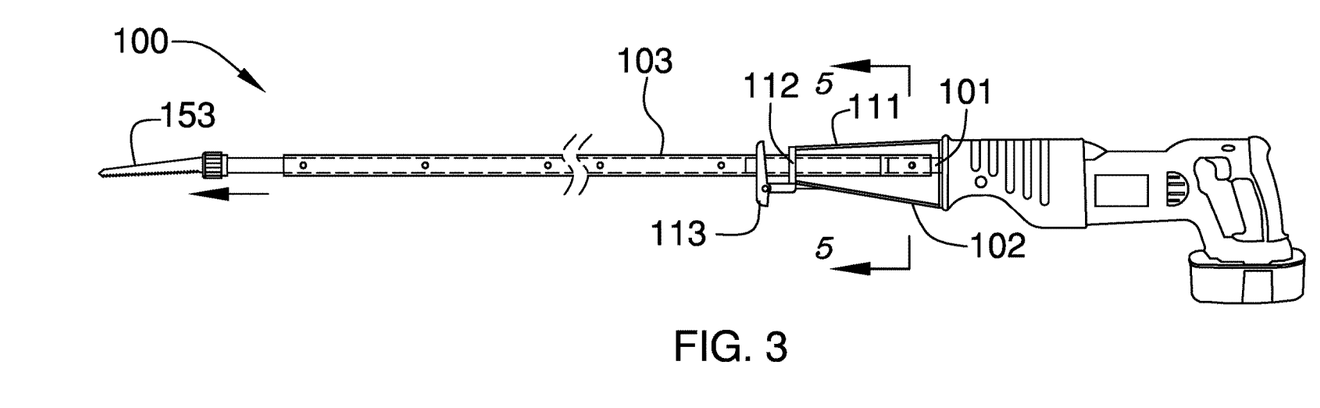
FIG. 3 is a front view of an embodiment of the disclosure.
Figure 4:
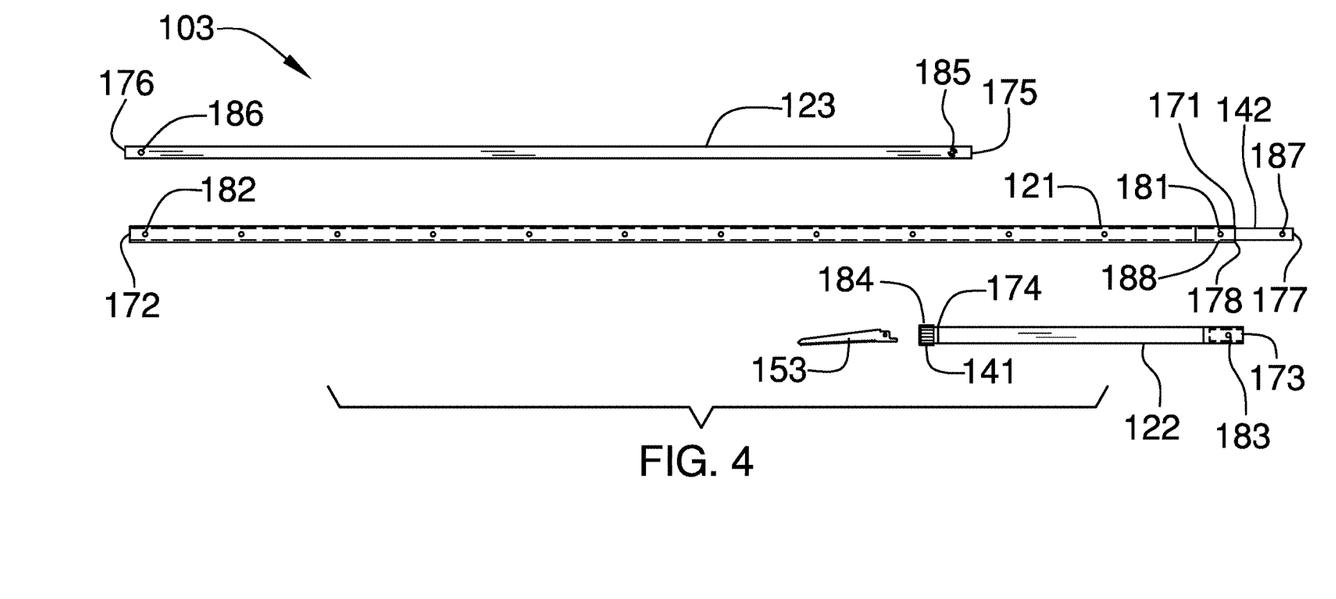
FIG. 4 is an exploded view of an embodiment of the disclosure.

As shown most clearly in FIGS. 3 and 4, the extensible structure 103 comprises a first structure 121, a second structure 122, and an optional one or more subsequent structures 123. The first structure 121, the second structure, and, if used, the one or more subsequent structures 123 are connected to each other. The first structure 121 is a readily and commercially available perforated square steel tube that is further defined with a first end 171, a second end 172, a first inner dimension 161, a first outer dimension 162, a first detent 181, and a second detent 182. The second structure 122 is a readily and commercially available perforated square steel tube that is further defined with a third end 173, a fourth end 174, a second inner dimension 163, a second outer dimension 164, a third detent 183, and a fourth detent 184.

Each of the one or more subsequent structures 123 is a readily and commercially available perforated square steel tube that is further defined with a fifth end 175, a sixth end 176, a third inner dimension 165, a third outer dimension 166, a fifth detent 185, and a sixth detent 186. The first inner dimension 161 is greater than the second outer dimension 164. The first inner dimension 161 is greater than the fourth outer dimension 168. The second inner dimension 163 is greater than the third outer dimension 166. The fourth inner dimension 167 is greater than the outer dimension 195 of the reciprocating shaft 101. The first outer dimension 161 is lesser that the inner dimension of the square formed by the support 112 such that the first structure 121 will fit through the support 112.

The first detent 181 is attached to the first end 171 of the first structure 121. The second detent 182 is attached to the second end 172 of the first structure 121. The third detent 183 is attached to the third end 173 of the second structure 122. The fourth detent 184 is attached to the fourth end 174 of the second structure 122. The fifth detent 185 is attached to the fifth end 175 of the one or more subsequent structures 123. The sixth detent 186 is attached to the sixth end 176 of the one or more subsequent structures 123. The seventh detent 187 is attached to the seventh end 177 of the linking shaft 142. The eighth detent 188 is attached to the eighth end 178 of the linking shaft 142.

The first structure 121 comprises a linking shaft 142. The linking shaft 142 is a steel tube that is further defined with a seventh end 177, an eighth end 178, a fourth inner dimension 167, a fourth outer dimension 168, a seventh detent 187, and an eighth detent 188. The purpose of the linking shaft 142 is to attach the extensible structure 103 to the reciprocating shaft 101.

The reciprocating shaft 101 includes a spring-loaded button 333 that is commonly used to secure the linking shaft 142 to the reciprocating saw 151. The spring-loaded button 33 is biased outwardly via a spring 335 (see FIG. 5). The spring-loaded button 333 of the reciprocating shaft 101 interfaces with a button-hole 334 provided on the linking shaft 142. This is well known in the art.

The second structure 122 comprises a quick release blade chuck 141. The quick release blade chuck 141 forms the fourth detent 184 described in this disclosure. The quick release blade chuck 141 is a commercially available connection that is used to attach a commercially available saw blade 153 to the extensible structure 103.

In the first potential embodiment of the disclosure, the linking shaft 142 attaches to the first structure 121 by inserting the eighth end 178 into the first end 171 and attaching the eighth detent 188 to the first detent 181. The eighth detent 188 and the first detent 181 are formed as a welded or brazed joint. The first structure 121 attaches to the second structure 122 by inserting the second end 172 into the third end 173 and attaching the second detent 182 to the third detent 183. The second detent 182 and the third detent 183 are formed from one or more cotter pins that are inserted through the perforations of the perforated steel tubes that form the first structure 121 and the second structure 122. Optionally, the one or more cotter pins may be exchanged for spring-loaded buttons. The extensible structure is then attached upon inserting the reciprocating shaft into the seventh end 177 of the linking shaft 142 and securing the attachment with the seventh detent 187. The seventh detent 187 is a commercially available attachment mechanism.

In the second potential embodiment of the disclosure, the linking shaft 142 attaches to the first structure 121 by inserting the eighth end 178 into the first end 171 and attaching the eighth detent 188 to the first detent 181. The eighth detent 188 and the first detent 181 are formed as a welded or brazed joint. The first structure 121 attaches to a subsequent structure selected from the one or more subsequent structures 123 by inserting the fifth end 175 into the second end 172 and attaching the fifth detent 185 to the second detent 182. The fifth detent 185 and the second detent 182 are formed from one or more cotter pins that are inserted through the perforations of the perforated steel tubes that form the subsequent structure selected from the one or more subsequent structures 123 and the first structure 121. Optionally, the one or more cotter pins may be exchanged for spring-loaded buttons. The subsequent structure selected from the one or more subsequent structures 123 attaches to the second structure 122 by inserting the sixth end 176 into the third end 173 and attaching the sixth detent 186 to the third detent 183.

The sixth detent 186 and the third detent 183 are formed from one or more cotter pins that are inserted through the perforations of the perforated steel tubes that form the subsequent structure selected from the one or more subsequent structures 123 and the second structure 122. The extensible structure is then attached upon inserting the reciprocating shaft into the seventh end 177 of the linking shaft 142 and securing the attachment with the seventh detent 187. The seventh detent 187 is a commercially available attachment mechanism. Additional subsequent structures selected from the one or more subsequent structures 123 may be added to the extensible structure 103 by repeating the procedure described in this paragraph.

To use the invention 100, the extensible shaft 103 is assembled and attached to the reciprocating saw 151 as described above. A saw blade 103 is attached to the fourth end 174 of the second structure 122 using the quick release blade chuck 141. The saw blade 103 is then placed against the portion of the tree to be pruned and the saw blade 153 is activated upon using the reciprocating saw normally.

It shall be noted that the extensible shaft 103 may be constructed of a square or tubular shaft.

The following definitions were used in this disclosure:

Apex: As used in this disclosure, an apex is the point of an object that has the greatest height or altitude relative to a given reference.

Cotter Pin: As used in this disclosure, a cotter pin is a metal shaft that is used to hold two mechanical components together.

Spring-Loaded Pin: As used in this disclosure, a spring-loaded pin is a button that is biased outwardly via a spring, and is used with a plurality of holes to provide interlocking of telescoping members.

Frustum: As used in this disclosure, a frustum is a portion of a solid that lies between two parallel planes that intersect with the solid.

Detent: As used in this disclosure, a detent is a device for positioning and holding one mechanical part in relation to another in a manner such that the device can be released by force applied to one or more of the parts.

Pyramid: As used in this disclosure, a pyramid is a three dimensional shape that comprises a square base with four faces that rise from the base to meet at a point above the base. If the point where the four faces meet is positioned such that a line drawn from the point where the four faces meet to the center of the square base is perpendicular to the square base, the pyramid is referred to as a right pyramid. Pyramids formed from rectangular bases instead of square bases are referred to as rectangular pyramids.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A horticultural tool comprising:
   a reciprocating shaft, an extension guard and an extensible structure;
   wherein the horticultural tool is configured to use with a reciprocating saw;
   wherein the reciprocating saw further comprises a reciprocating structure;
   wherein the horticultural tool is a bladed device that is adapted for use in cutting a plant;
   wherein the horticultural tool is configured to extend the reach of the reciprocating saw;
   wherein the reciprocating shaft is configured to connect the extensible structure to the reciprocating saw;
   wherein the extensible structure is inserted through the extension guard;
   wherein the reciprocating shaft is attached to the reciprocating structure of the reciprocating saw;
   wherein the reciprocating shaft includes a spring-loaded button that is used to secure a linking shaft to the reciprocating saw;
   wherein the spring-loaded button is biased outwardly via a spring;
   wherein the spring-loaded button of the reciprocating shaft interfaces with a button-hole provided on the linking shaft;
   wherein the extension guard comprises a guard, a support, and a foot;
   wherein the guard is formed in the shape of a frustum of a pyramid wherein the base of the pyramid is attached to the reciprocating saw;
   wherein the support is a square structure that forms a frustum surface that is proximal to the apex of the pyramid;
   wherein the foot is a structure that attaches to the support such that the foot projects away from the support in a direction away from the reciprocating saw;
   wherein the guard comprises a frame;
   wherein the frame is the structural framework that forms the pyramidal shape of the guard;
   wherein the frame is formed from a plurality of metal shafts;
   wherein the support comprises a plurality of rollers, and a plurality of corners;
   wherein the support is a square shaped structure;

wherein each of the plurality of corners is a piece of metal;

wherein each of the plurality of corners is used to form a corner of the square shaped structure;

wherein any first corner selected from the plurality of corners is attached to a second corner selected from the plurality of corners by a roller selected from the plurality of rollers.

2. The horticultural tool according to claim 1
wherein each of the plurality of rollers comprises an inner shaft and an outer shaft;
wherein the inner shaft and the outer shaft are connected such that the outer shaft rotates around the inner shaft;
wherein the plurality of corners are interconnected using the inner shafts of each of the plurality of rollers.

3. The horticultural tool according to claim 2
wherein the outer shaft is in contact with the extensible structure;
wherein the outer shaft rotates any reciprocating motion of the extensible structure.

4. The horticultural tool according to claim 3
wherein the foot comprises a first offset, a second offset, and a U brace;
wherein the first offset and the second offset attach the U brace to the support.

5. The horticultural tool according to claim 4
wherein the first offset is a shaft;
wherein the second offset is a shaft;
wherein the first offset attaches to a corner selected from the plurality of corners;
wherein the second offset attaches to a corner selected from the plurality of corners;
wherein the U brace is a U shaped structure;
wherein the first offset and the second offset attach the U brace to the support.

6. The horticultural tool according to claim 5
wherein the extensible structure comprises a first structure and a second structure;
wherein the first structure, the second structure, and the one or more subsequent structures are connected to each other.

7. The horticultural tool according to claim 6
wherein the first structure is further defined with a first end; a second end, a first inner dimension, a first outer dimension, a first detent, and a second detent;
wherein the second structure is further defined with a third end; a fourth end, a second inner dimension, a second outer dimension, a third detent, and a fourth detent;
wherein the first inner dimension is greater than the second outer dimension;
wherein the first outer dimension is lesser that the inner dimension of the square formed by the support such that the first structure will fit through the support;
wherein the first detent is attached to the first end of the first structure;
wherein the second detent is attached to the second end of the first structure;
wherein the third detent is attached to the third end of the second structure;
wherein the fourth detent is attached to the fourth end of the second structure.

8. The horticultural tool according to claim 7
wherein the linking shaft is a steel tube that is further defined with a seventh end, an eighth end, a fourth inner dimension; a fourth outer dimension; a seventh detent, and an eighth detent;

wherein the linking shaft attaches the extensible structure to the reciprocating shaft;
wherein the first inner dimension is greater than the fourth outer dimension;
wherein the fourth inner dimension is greater than the outer dimension of the reciprocating shaft;
wherein the seventh detent is attached to the seventh end of the linking shaft;
wherein the eighth detent is attached to the eighth end of the linking shaft.

9. The horticultural tool according to claim 8
wherein the second structure comprises a quick release blade chuck;
wherein the quick release blade chuck forms the fourth detent;
wherein the quick release blade chuck is attaches a saw blade to second structure.

10. The horticultural tool according to claim 9
wherein the linking shaft attaches to the first structure by inserting the eighth end into the first end and attaching the eighth detent to the first detent;
wherein the first structure attaches to the second structure by inserting the second end into the third end and attaching the second detent to the third detent;
wherein the extensible structure is then attached by inserting the reciprocating shaft into the seventh end of the linking shaft and securing the attachment with the seventh detent.

11. The horticultural tool according to claim 10
wherein the eighth detent and the first detent are formed as a welded or brazed joint.

12. The horticultural tool according to claim 5
wherein the extensible structure comprises a first structure, a second structure, and one or more subsequent structures;
wherein the first structure, the second structure, and the one or more subsequent structures are connected to each other;
wherein the first structure is further defined with a first end, a second end, a first inner dimension, a first outer dimension, a first detent, and a second detent;
wherein the second structure is further defined with a third end, a fourth end, a second inner dimension, a second outer dimension, a third detent, and a fourth detent;
wherein each of the one or more subsequent structures is further defined with a fifth end, a sixth end, a third inner dimension, a third outer dimension, a fifth detent, and a sixth detent;
wherein the first inner dimension is greater than the second outer dimension;
wherein the second inner dimension is greater than the third outer dimension;
wherein the first outer dimension is lesser that the inner dimension of the square formed by the support such that the first structure will fit through the support;
wherein the first detent is attached to the first end of the first structure;
wherein the second detent is attached to the second end of the first structure;
wherein the third detent is attached to the third end of the second structure;
wherein the fourth detent is attached to the fourth end of the second structure;
wherein the fifth detent is attached to the fifth end of each of the one or more subsequent structures;
wherein the sixth detent is attached to the sixth end of each of the one or more subsequent structures.

13. The horticultural tool according to claim 12;
wherein the linking shaft is a steel tube that is further defined with a seventh end, an eighth end, a fourth inner dimension, a fourth outer dimension, a seventh detent, and an eighth detent;
wherein the linking shaft attaches the extensible structure to the reciprocating shaft;
wherein the first inner dimension is greater than the fourth outer dimension;
wherein the fourth inner dimension is greater than the outer dimension of the reciprocating shaft;
wherein the seventh detent is attached to the seventh end of the linking shaft;
wherein the eighth detent is attached to the eighth end of the linking shaft.

14. The horticultural tool according to claim 13
wherein the second structure comprises a quick release blade chuck;
wherein the quick release blade chuck forms the fourth detent;
wherein the quick release blade chuck is attaches a saw blade to second structure.

15. The horticultural tool according to claim 14
wherein the linking shaft attaches to the first structure by inserting the eighth end into the first end and attaching the eighth detent to the first detent;
wherein the first structure attaches to a subsequent structure selected from the one or more subsequent structures by inserting the fifth end into the second end and attaching the fifth detent to the second detent;
wherein the subsequent structure selected from the one or more subsequent structures attaches to the second structure by inserting the sixth end into the third end and attaching the sixth detent to the third detent;
wherein the extensible structure is attached by inserting the reciprocating shaft into the seventh end of the linking shaft and securing the attachment with the seventh detent.

\* \* \* \* \*